(12) United States Patent  (10) Patent No.: US 8,908,220 B2
Miyazawa et al.  (45) Date of Patent: Dec. 9, 2014

(54) INFORMATION PROCESSING SYSTEM, PRINT SYSTEM, AND METHOD AND COMPUTER-READABLE STORAGE MEDIUM FOR CONTROLLING INFORMATION PROCESSING SYSTEM

(75) Inventors: Hiroyasu Miyazawa, Tokyo (JP); Jun Otsuka, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/058,824

(22) PCT Filed: Oct. 14, 2010

(86) PCT No.: PCT/JP2010/006102
§ 371 (c)(1),
(2), (4) Date: Feb. 11, 2011

(87) PCT Pub. No.: WO2011/052145
PCT Pub. Date: May 5, 2011

(65) Prior Publication Data
US 2012/0218595 A1  Aug. 30, 2012

(30) Foreign Application Priority Data

Oct. 27, 2009 (JP) ................................ 2009-246669

(51) Int. Cl.
*G06K 15/00* (2006.01)
*G06F 3/12* (2006.01)

(52) U.S. Cl.
CPC ............... *G06F 3/126* (2013.01); *G06F 3/124* (2013.01); *G06F 3/1288* (2013.01); *G06F 3/1213* (2013.01)
USPC ......... 358/1.16; 358/1.15; 358/1.17; 358/1.1; 711/1; 711/100

(58) Field of Classification Search
CPC .................................................. G06F 12/0692
See application file for complete search history.

(56) References Cited

U.S. PATENT DOCUMENTS 5,995,721 A * 11/1999 Rourke et al. ............... 358/1.15
8,154,737 B2 * 4/2012 Ferlitsch ...................... 358/1.13
(Continued)

FOREIGN PATENT DOCUMENTS

CN  101031882 A  9/2007
JP  H08-044576 A  2/1996
(Continued)

OTHER PUBLICATIONS

European Search Report issued in corresponding application No. 10826282.5 on Mar. 13, 2013.

(Continued)

*Primary Examiner* — Hilina K Demeter
(74) *Attorney, Agent, or Firm* — Carter, DeLuca, Farrell & Schmidt, LLP

(57) ABSTRACT

An information processing system may include at least an image processing device and includes a receiving unit, a specifying unit, an acquiring unit, and an adjusting unit. The receiving unit receives a print request and identification information. The specifying unit specifies a queue corresponding to image forming device based on the identification information. The acquiring unit acquires the number of jobs stored in the specified queue. The adjusting unit adjusts the number of print services depending on whether the number of acquired jobs is equal to or larger than a predetermined value for the number of jobs set in the identification information and depending on whether the number of print services that process the jobs stored in the queue is equal to or smaller than a predetermined value for the number of print services set in the identification information.

13 Claims, 11 Drawing Sheets

(56) References Cited

U.S. PATENT DOCUMENTS

| | | | |
|---|---|---|---|
| 8,321,530 B2 * | 11/2012 | Miyazawa | 709/217 |
| 2003/0095282 A1 * | 5/2003 | Suzuki et al. | 358/1.15 |
| 2003/0227651 A1 * | 12/2003 | Mathieson | 358/1.16 |
| 2006/0050294 A1 * | 3/2006 | Smith et al. | 358/1.15 |
| 2009/0153892 A1 * | 6/2009 | Torii | 358/1.13 |

FOREIGN PATENT DOCUMENTS

| | | |
|---|---|---|
| JP | 8-263440 A | 10/1996 |
| JP | 11-154065 A | 6/1999 |
| JP | 2002-304271 A | 10/2002 |
| JP | 2005-245000 A | 9/2005 |
| JP | 2007-207219 A | 8/2007 |
| JP | 2007-226565 A | 9/2007 |
| JP | 2009-262376 A | 11/2009 |
| JP | 2010-120196 A | 6/2010 |
| WO | 2009117288 A1 | 9/2009 |

OTHER PUBLICATIONS

Japanese Office Action issued in corresponding application No. 2009-246669 on Apr. 23, 2013.

International Search Report issued in corresponding application No. PCT/JP2010/006102 mailed Dec. 28, 2010.

Chinese Office Action issued in corresponding application No. 201080048408.6 on Apr. 23, 2014.

Japanese Office Action issued in corresponding application No. 2013182935 on Sep. 16, 2014.

* cited by examiner

Fig. 5

```
PUT http://print-sv.queue.net/dev_0001pueue/messages   ~501
?VisitilityTimeout=30   ~502
503~ ;messagettl=3600
    x・ms・date:Mon, 14 Sep 2009 17:00:25 GMT  ~504
    .......MESSAGE DATA CONTENT........
    <message>
    <request id='0001' />   ~505
    <document id='d_00001'>   ~506
    documentURI=http://print-sv.blob.net/dev_0001/document/document_001.doc/>   ~507
    <result storedURI='http://print-sv.vlob.net/dev_0001/printdata/pdl_0001' />   ~508
    </message>
```

Fig. 6A

| Queue ID | Device_id | Device model | Number of Instance | Queue Length |
|---|---|---|---|---|
| 1001 | d_0001_1234 | Dev_0001 | 2 | 5 |
| 1002 | d_0010_5678 | Dev_0010 | 3 | 10 |

| request_id | document_id | result_storedURI |
|---|---|---|
| 0001 | d_00001 | http://print-sv.blobnet/dev_0001/printdata/pdl_0001 |
| 0010 | d_00100 | |

| QueueID | Number of Instance | Queue Length |
|---------|--------------------|--------------|
| 1 | 300 | 50 |
| 2 | 200 | 100 |
| ... | ... | ... |
| 100 | 10 | 1000 |
| 101 | 10 | 1500 |
| 102 | 5 | 1000 |
| 103 | 5 | 1500 |

INFORMATION PROCESSING SYSTEM, PRINT SYSTEM, AND METHOD AND COMPUTER-READABLE STORAGE MEDIUM FOR CONTROLLING INFORMATION PROCESSING SYSTEM

CROSS REFERENCE TO RELATED APPLICATIONS

This application is a National Stage filing of PCT application No. PCT/JP2010/006102, filed Oct. 14, 2010, which claims priority from Japanese Patent Application No. 2009-246669, filed Oct. 27, 2009, all of which are hereby incorporated by reference herein in their entirety.

FIELD

The present invention relates to an information processing system, a print system, and a method and a computer-readable storage medium for controlling the information processing system.

TECHNICAL FIELD

Background Art

A content management system that uses the Internet technique is becoming widespread. A user makes access to a Web page established by a server computer from a client computer through the Internet, and selects a content on the Web page that the user wants to browse. The content management system transmits the selected content to the server computer. The server computer processes the received content to display the content for the user.

Patent Literature 1 discloses a method for printing by a printer a content browsed by a user with a client computer. With this method, a server computer converts the content browsed by the user into data that can be printed by the printer, and transmits the converted data to the printer. The printer prints the received data.

Also, in recent years, a cloud computing system and a technique called software as a service (SaaS) are becoming popular as an example in which the server computer performs various processing.

CITATION LIST

Patent Literature

PTL 1: Japanese Patent Laid-Open No. 2002-304271

However, there is no proper rule relating to the use of a cloud resource. The cloud resource may not be properly used. Hence, the following disadvantages may appear.

A first disadvantage is that if a plurality of devices are connected, unless the cloud resource is properly used, the resource may be wasted.

A second disadvantage is that since the cloud is charged on an as-used basis. A cloud vendor requests the user to pay as the user uses the cloud resource. Thus, if the cloud resource is wasted, the wastage may result in an extra cost.

A third disadvantage is that even if a device using the cloud resource has a low device performance, the cloud resource may be excessively allocated to the device. Hence, the following wastage may appear. It is assumed that a user performs printing with a printer at a low print speed. The user requests the printer to print a large number of contents. Consequently, the printer requests the cloud to handle image processing jobs for the large number of contents instructed for printing. The cloud starts the image processing for the requested contents. The cloud transmits the contents to the printer in order from the content with the image processing completed. The printer starts printing the received content. The printer ends printing the content, and then receives the content to be printed next. Unfortunately, since the printer has the low print speed, the image processed contents are stacked in the cloud on and on. At this time, it is assumed that the user instructs the printer to cancel printing. Then, the contents after the image processing by the cloud are no longer used by the printer for printing. As the result, the cloud resource used by the cloud for the image processing is wasted.

SUMMARY OF THE INVENTION

The present invention provides an image processing system, a print system, and a method and a program for controlling the image processing system that address at least one of the above-described disadvantages.

According to a first embodiment of the present invention, an information processing system including at least an image processing device includes a receiving unit configured to receive a print request and identification information for identifying an image forming device; a specifying unit configured to specify a queue corresponding to the image forming device on the basis of the identification information received by the receiving unit; an acquiring unit configured to acquire the number of jobs that are stored in the queue specified by the specifying unit; and an adjusting unit configured to adjust the number of print services depending on whether the number of jobs acquired by the acquiring unit is equal to or larger than a predetermined value for the number of jobs set in the identification information and depending on whether the number of print services that process the jobs stored in the queue is equal to or smaller than a predetermined value for the number of print services set in the identification information. The print services the number of which has been adjusted by the adjusting unit includes an executing unit configured to execute processing for converting a content corresponding to the print request received by the receiving unit into print data.

Advantageous Effects of Invention

With the first embodiment of the present invention, the cloud resource can be properly used.

BRIEF DESCRIPTION OF DRAWINGS

FIG. 5 illustrates an example of a queue message.

FIG. 6A illustrates an example of a queue management table according to the first embodiment.

FIG. 6B illustrates an example of a process check table.

DESCRIPTION OF EMBODIMENTS

Embodiments of the present invention will be described below in detail with reference to the attached drawings. The definitions for words used in the embodiments of the present invention will be described.

Polling is processing that when a client requests a host for processing, the client makes an inquiry about the progress of processing to a host at a predetermined time interval to check the progress or completion of processing.

Print data processing is processing that when a user wants to print a content, the content is converted into data that can be printed by an image forming device, such as a multi function peripheral (MFP) or a printer.

A content is, for example, electronic data in which document data and image data are combined.

A content ID is, for example, specific information assigned to every content to uniquely identify the content. In this case, different contents have different content IDs.

Print data is, for example, data obtained by converting a content through print data processing. The print data may be in the form of page description language (PDL), portable document format (PDF), or a raster image.

First Embodiment

Figure 1:
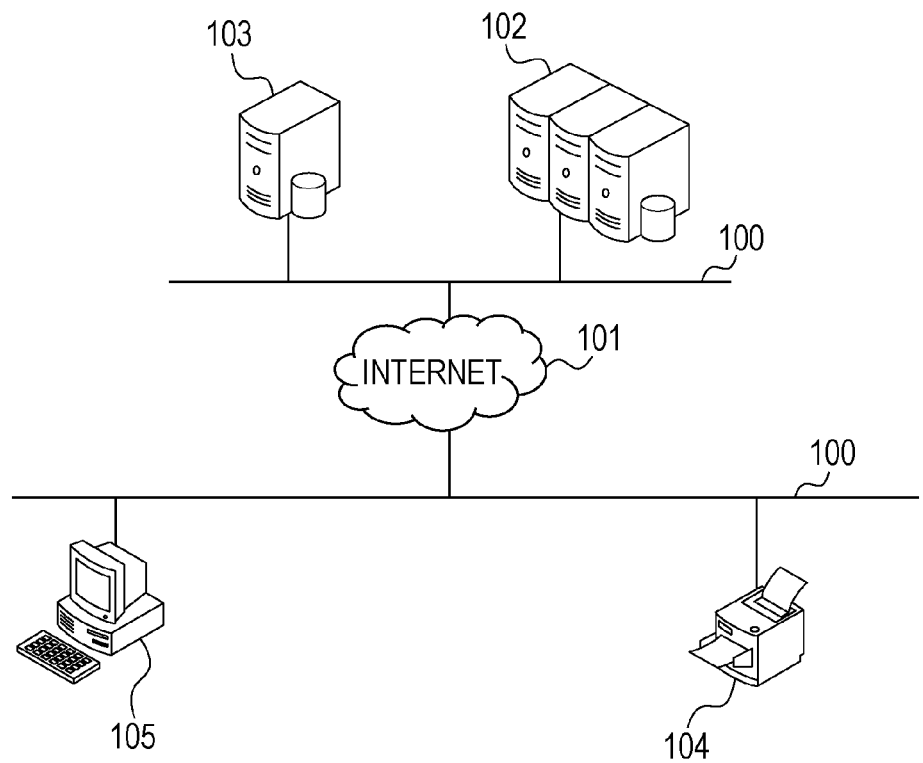
FIG. 1 illustrates a print system according to a first embodiment.

Devices that configure a print system according to a first embodiment will be described in detail with reference to FIG. 1. FIG. 1 illustrates a state in which the devices that configure the print system are connected with one another through networks 100. The devices that configure the print system includes a server computer group 102, a document server 103, an image forming device 104, and a client computer 105.

The networks 100 are communication lines for handling information among the devices. The Internet 101 is a communication line for handling information among the devices over firewalls. The Internet 101 allows the network 100, to which the server computer group 102 and the document server 103 pertain, and the network 100, to which the image forming device 104 and the client computer 105 pertain, to make communication therebetween over the firewalls. The networks 100 and the Internet 101 are, for example, wired or wireless communication line networks that support, for example, protocols of TCP/IP. Referring to FIG. 1 according to the first embodiment, the server computer group 102 includes a plurality of server computers although the server computer group 102 is illustrated as a single server.

Figure 2A:
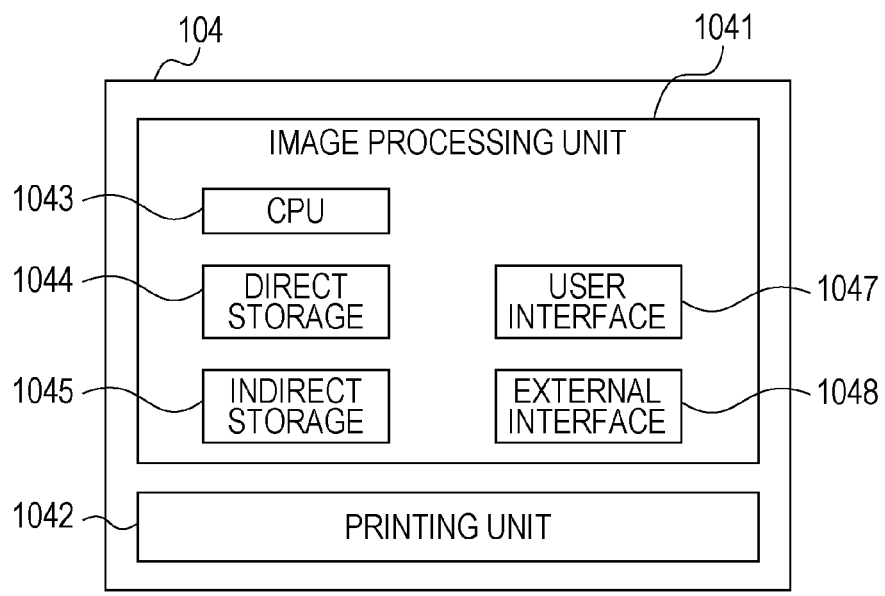
FIG. 2A illustrates an inner configuration of an image forming device 104.

Inner configurations of the devices that configure the print system shown in FIG. 1 will be described in detail. An inner configuration of the image forming device 104 will be described with reference to FIG. 2A. FIG. 2A is a block diagram showing an exemplary inner configuration of the image forming device 104. It is to be noted that a device according to the first embodiment of the present invention is the image forming device 104.

The image forming device 104 includes an image processing unit 1041 and a printing unit 1042. The image processing unit 1041 includes a CPU 1043, a direct storage 1044, an indirect storage 1045, a user interface 1047, and an external interface 1048.

The CPU 1043 is a unit that executes a predetermined program and instructs various controls of the image forming device 104. The CPU 1043 is a central processing unit (CPU). The direct storage 1044 is a work memory that is used when the CPU 1043 executes the program. The program executed by the CPU 1043 is loaded in the direct storage 1044. The direct storage 1044 is a random access memory (RAM). The indirect storage 1045 stores various programs including an application program and a platform program. The CPU 1043 moves the various programs stored in the indirect storage 1045 to the direct storage 1044 when the CPU 1043 executes the programs. The indirect storage 1045 is a solid state drive (SSD) or a hard disc drive (HDD). Alternatively, the CPU 1043 may be a multiprocessor.

The platform will be described in detail. If the platform is provided, an original application that is developed by a user can be executed in the image forming device 104, and an operation screen of the image forming device 102 can be customized.

A method for providing the platform will be described. The CPU 1043 moves the platform program stored in the indirect storage 1045 to the direct storage 1044. When the program has been moved, the CPU 1043 is ready for execution of the platform program. In the first embodiment of the present invention, execution of the platform program by the CPU 1043 is called activation of the platform. The platform is operated on firmware in the image forming device 104. The platform program provides an environment for execution of the application program that is written in an object-oriented style.

A method for executing the application on the platform will be described in detail. In the first embodiment of the present invention, print software that receives a print request is operated on the platform. The print software can receive print data from the devices connected through the network 100 or the Internet 101 by a communication protocol such as the hyper text transfer protocol (HTTP). The print software transmits the received print data to the firmware. The firmware which has received the print data starts processing for graphing the print data. As described above, by executing the application program on the platform, the image forming device 104 can be controlled.

A method for executing the application program will be described. The activated platform moves the application program stored in the indirect storage 1045 to the direct storage 1044. When the program has been moved, the platform is ready for execution of the application program. The platform executes the application program. In the first embodiment of the present invention, a function of the platform provided by executing the application program as described above is called platform application. The platform can perform part of processing of flowcharts described in the first embodiment of the present invention.

A user interface 1047 is a unit that is required for receiving a process request from the user. For example, the user interface 1047 receives a signal in accordance with an instruction input by a user with a keyboard, a mouse, etc. The external interface 1048 can receive data from an external device and transmits data to the external device. For example, the external device may be an external storage device, such as an external HDD or an external USB memory, or a separate device, such as a separate host computer or a separate image forming device, which is connected through the network. The image forming device 104 can make communication with the client computer 105 and the server computer group 102 through the network 100 and the Internet 101.

Figure 2B:
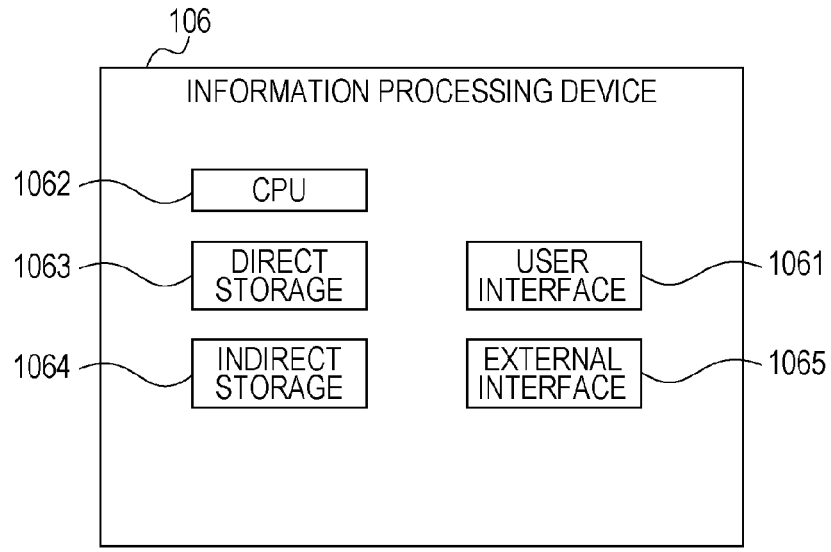
FIG. 2B illustrates an inner configuration of an image processing device 106.

An inner configuration of the information processing device including the server computer group 102, the document server 103, and the client computer 105 will be described with reference to FIG. 2B. FIG. 2B is a block diagram showing an exemplary inner configuration of the image processing device 106. The image processing device 106 includes a user interface 1061, a CPU 1062, a direct storage 1063, an indirect storage 1064, and an external interface 1065.

The user interface 1061 is a unit that is required for receiving a process request from the user. For example, the user interface 1047 receives a signal in accordance with an instruction input by a user with a keyboard, a mouse, etc.

The CPU 1062 is a unit that executes a predetermined program and instructs various controls of the image processing device 106. The CPU 1062 is a CPU. The direct storage 1063 is a work memory that is used when the CPU 1062 executes the program. The program executed by the CPU 1062 is loaded in the direct storage 1063. The direct storage 1063 is a RAM. The indirect storage 1064 stores various programs including an application program and an operating system (OS). The CPU 1062 moves the various programs stored in the indirect storage 1064 to the direct storage 1063 when the CPU 1062 executes the programs. The indirect storage 1064 is a ROM or a HDD. The external interface 1065 is connected with the network 100, and hence can make communication with other devices that are connected with the network 100.

Figure 3:
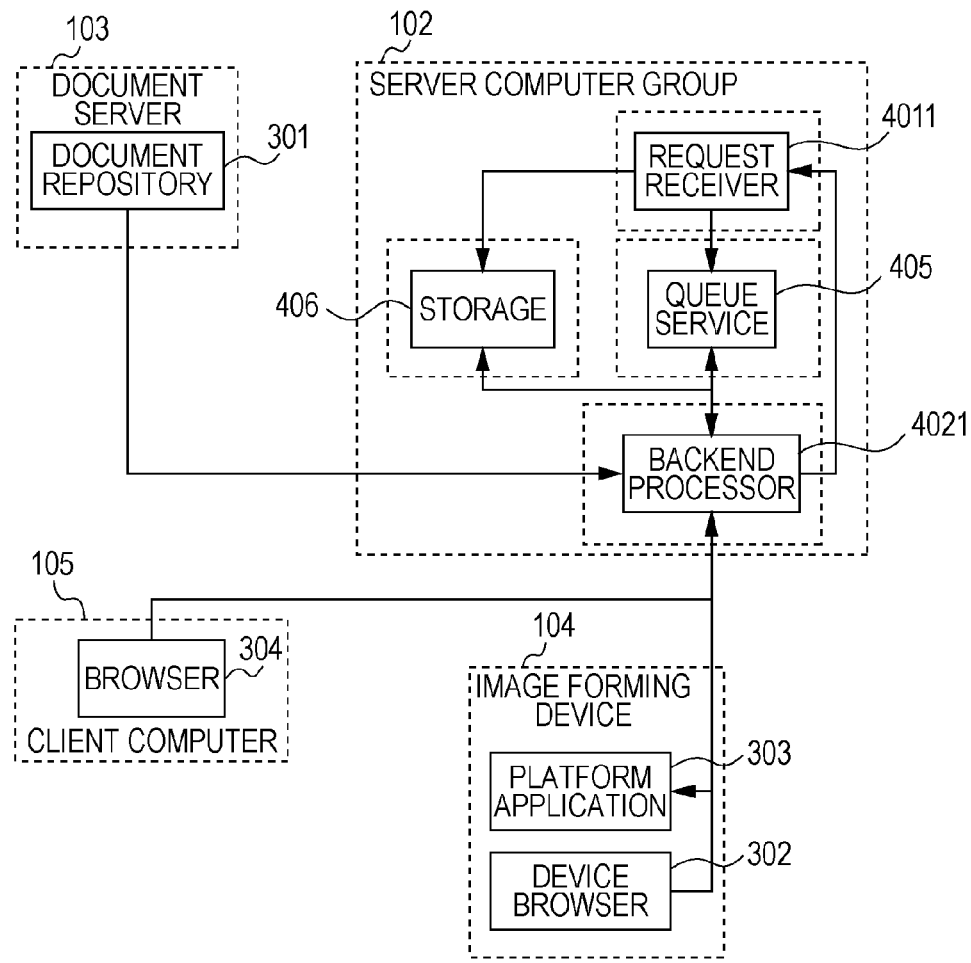
FIG. 3 is a functional block diagram showing devices in the print system.

Functions of the devices in the print system according to the first embodiment will be described in detail with reference to FIG. 3. FIG. 3 is a functional block diagram showing the devices in the print system.

Functions of the server computer group 102 will be described. The server computer group 102 has functions including a request receiver 4011, a backend processor 4021, a queue service 405, and a storage 406. In the first embodiment of the present invention, the server computer group 102 includes at least a server computer having the request receiver 4011, at least a server computer having the backend processor 4021, and at least a server computer having functions of both the queue service 405 and the storage 406. The server computer group 102 is called information processing system. This embodiment of the present invention is an embodiment of a method for controlling the information processing system.

The request receiver 4011 has a function of receiving a process request that is transmitted from the client computer 105 or the image forming device 104. The backend processor 4021 has a function of executing processing for the process request, through a processing program. In particular, the backend processor 4021 loads the processing program in a memory of a server computer that executes the backend processor 4021, and executes the processing. The request receiver 4011 and the backend processor 4021 are actualized by loading in the direct storage 1063 a request receiving program and a backend processing program stored in the indirect storage 1064 shown in FIG. 2B, and executing the loaded programs by the CPU 1062.

The queue service 405 has the following functions. A first function is of allowing the request receiver 4011 to make asynchronous data communication with the backend processor 4021. A second function is of making a queue message that is added to a queue invisible or visible.

The first function will be described. The request receiver 4011 and the backend processor 4021 have communication by the following method. The request receiver 4011, which has received the process request from the user, generates a ticket that is called queue message, corresponding to the process request from the user. At this time, the request receiver 4011 also generates a reception ID corresponding to the queue message. The queue message and the reception ID will be described later. The request receiver 4011 stores the queue message in a queue. The backend processor 4021 acquires the queue message from the queue. The backend processor 4021 acquires the queue message, and processes the process request from the user with reference to the queue message. Accordingly, the process request from the user is addressed. As described above, by using the queue service 405, the request receiver 4011 and the backend processor 4021 make asynchronous data communication with one another. The first function will be more specifically described later in detail. Also, the second function will be described later. The queue service 405 is actualized by loading in the direct storage 1063 a queue service program that is stored in the indirect storage 1064 shown in FIG. 2B, and executing the loaded program by the CPU 1062. The queue is actualized by the indirect storage 1064.

The storage 406 has a function of storing various data such as data of execution result processed by the backend processor 4021. The storage 406 is actualized by the indirect storage 1046 shown in FIG. 2B. Although the functions of the server computer group 102 have been described above, the functions will be more specifically described later.

A function of the document server 103 will be described. The document server 103 has a function of a document repository 301. The document repository 301 is actualized by the indirect storage 1046 shown in FIG. 2B. For example, the document repository 301 stores the content instructed by the user for printing from the client computer 105 or the image forming device 104. The content stored in the document repository 301 stores the following content in addition to the previously stored content.

The content is generated by the user by using the application in the server computer group 102 through a browser 304. Even if the content has been generated by using the application in the server computer group 102, the content can be easily printed although the application is not installed in the image forming device 104 or the client computer 105. The application in the server computer group 102 may be various applications, such as a document formation application, an image formation application, and a form management application. These applications are stored in the indirect storage 1064 shown in FIG. 2B. When execution of the applications is instructed, the applications are loaded in the direct storage 1063, and executed by the CPU 1062.

The image forming device 104 will be described in detail. The image forming device 104 has functions including a device browser 302 and a platform application 303. The device browser 302 has a function of allowing the user to browse data and information stored in the devices connected through the network 100. The device browser 302 is actualized by loading in the direct storage 1044 a device browser program that is stored in the indirect storage 1045 shown in FIG. 2A, and executing the loaded program by the CPU 1043. Also, the user can give an instruction for printing a content with the device browser 302. The device browser 302 is, for example, a Web browser.

The platform application 303 has a function of providing various services. The platform application 303 is actualized by an application program operated on the platform. In the first embodiment of the present invention, the platform application 303 provides a service for print software. As described above, the service transmits the received print data to the firmware. Also, the service checks the request receiver 4011 whether generation of the print data is ended or not. At this time, the service checks the generation on the basis of the reception ID generated by the request receiver 4011.

The client computer 105 will be described in detail. The client computer 105 has a function of a browser 304. The browser 304 has a function of allowing the user to browse data and information stored in the devices connected through the network 100. The browser 304 is actualized by loading in the direct storage 1063 a browser program that is stored in the indirect storage 1064 shown in FIG. 2B, and executing the loaded program by the CPU 1062. The browser 304 is, for example, a Web browser. The above description is for the functions of the devices in the print system according to the first embodiment.

Figure 4:
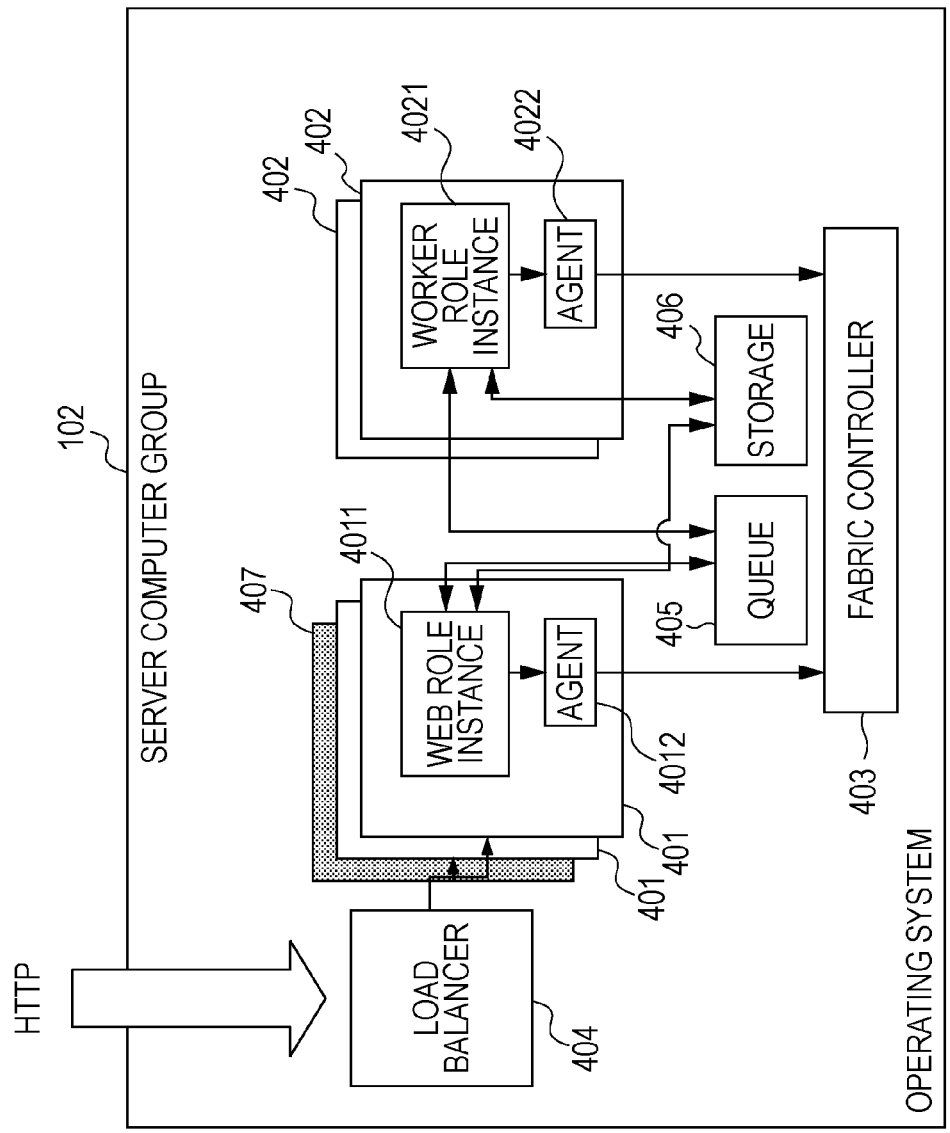
FIG. 4 illustrates functions provided in a server computer group 102.

The platform system in the server computer group 102 will be described in detail with reference to FIG. 4. FIG. 4 illustrates functions provided in the server computer group 102. Referring to FIG. 4, a physical hardware resource in the server computer group 102 is used for the platform system in the server computer group 102. A user of the platform system in the server computer group 102 uses the physical hardware resource in the server computer group 102 as a computing resource.

The platform system (operating system) in the server computer group 102 has functions including virtual machines 401 and 402, a fabric controller 403, a load balancer 404, a queue service (queue) 405, a storage 406, and an administrative virtual machine 407.

The platform system operated in the server computer group 102 includes the plurality of virtual machines 401 and 402. The virtual machines are logical computers obtained such that the physical server computer group 102 is divided through a virtualization technique. The divided logical computers are respectively operated by individual operating systems. A unit of the logical computers is counted as an instance. In the first embodiment of the present invention, a single instance is operated on a single server computer in the server computer group 102.

The virtual machine 401 includes a request receiver (Web role instance) 4011 and a request receiver agent (agent) 4012. The request receiver 4011 receives a process request from a user through the load balancer 404 (described later). The request receiver 4011 transmits the process request to the backend processor 4021 through the queue service 405.

To provide high availability of the request receiver 4011, a request from an external network (herein, communication with HTTP) is transmitted through the load balancer 404 provided outside the virtual machine 401. The road balancer 404 collectively manages requests from the external network and selectively transfers the requests to the plurality of virtual machines including the request receivers. Accordingly, the process requests are reliably transmitted to the request receivers. The request receiver agent 4012 collects various information including a use state of the virtual machine 401, an operating state of the request receiver 4011, a use state of a resource of the virtual machine 401, and an error of the request receiver 4011. The request receiver agent 4012 periodically transmits the collected various information to the fabric controller 403.

The fabric controller 403 manages instances of the request receiver 4011 and the backend processor 4021. Thus, expandability and availability of the instances are assured. For example, it is assumed that a specific instance is stopped in the request receiver 4011 or the backend processor 4021 due to a failure of a server. In this case, the fabric controller 403 no longer receives a periodical notification from the request receiver agent 4012 or the backend processor agent 4022. The fabric controller 403 that no longer receives the periodical notification instructs the virtual machine to give the processing to a new instance. Accordingly, the number of instances that execute processing is kept constant. The processing can be prevented from being delayed.

The virtual machine 402 includes a backend processor (worker role instance) 4021 and a backend processor agent (agent) 4022. The backend processor 4021 receives the process request from the request receiver 4011 through the queue service 405. The backend processor 4021 executes the process request received from the request receiver 4011 through the queue service 405. The backend processor 4021 is scaled out. Scaling out represents that the number of virtual machine 402 is increased, and the number of instances of the backend processors 4021 is increased. If the instances of the backend processors 4021 are increased, a data processing amount per backend processor is decreased. Hence, the result of the process request from the user can be returned quickly.

The queue service 405 provides a service for asynchronous data communication between the request receiver 4011 and the backend processor 4021. The request receiver 4011 and the backend processor 4021 perform the asynchronous data communication therebetween by outputting various instructions to the queue service 405. This will be described in detail. An instruction from the request receiver 4011 to the queue service 405 is an instruction to add a queue message. Instructions from the backend processor 4021 to the queue service 405 are an instruction to acquire a queue message, and an instruction to delete a queue message.

A series of operations for the asynchronous data communication between the request receiver 4011 and the backend processor 4021 will be described. The request receiver 4011 generates a queue message corresponding to the process request from the user, and transmits the addition instruction to the queue service 405 to add the queue message to the queue. The queue service 405 that has received the addition instruction adds the queue message to the queue. The backend processor 4021 gives the acquisition instruction to the queue service 405 to acquire the queue message. The queue service 405 that has received the acquisition instruction returns the queue message, a message ID assigned to the queue message, and a reception ID, as a response, to the backend processor 4021. The message ID is specific information assigned to every queue message to uniquely identify the queue message. The reception ID is used when the backend processor 4021 gives the deletion instruction for the queue message after the processing is ended. The queue message, the message ID, and the reception ID are associated with one another and stored. When the backend processor 4021 completes the process request, the backend processor 4021 gives the deletion instruction for the queue message corresponding to the reception ID to the queue service 405. The queue service 405 which has received the deletion instruction deletes the queue message corresponding to the reception ID instructed by the backend processor 4021, from the queue. Accordingly, a backend processor 4021 other than the backend processor 4021 that has given the deletion instruction will not process the same queue message. Hence, redundant processing can be prevented.

The queue service 405 has a function of making the queue message that is added to the queue invisible or visible Making invisible represents that the queue service 405 does not hand the queue message to the backend processor 4021 when the backend processor 4021 gives the acquisition request for the queue message added to the queue. When the backend processor 4021 acquires the queue message from the queue, the queue service 405 makes the acquired queue invisible. Making visible represents that the queue service 405 hands the queue message to the backend processor 4021 when the backend processor 4021 gives the acquisition request for the queue message added to the queue. The queue service 405 makes the queue message, which has been acquired by the backend processor 4021 and made invisible, visible when the processing result is not returned from the backend processor 4021 that performs the processing, for a predetermined period.

The storage 406 provides a storage that is used for storing data. Also, the storage 406 provides a function of storing a set of binary data. Further, the storage 406 provides a function of storing a process check table and a queue management table (described later).

The virtual machine 407 includes a request receiver 4011 and a request receiver agent 4012. The virtual machine 407 is different from the virtual machine 401 in that the virtual machine 407 has an instance of the request receiver 4011 that only an administrative user can use. The administrative user can operate the queue management table through the request receiver 4011 of the virtual machine 407.

A queue message according to the first embodiment of the present invention will be described. FIG. 5 illustrates an example of a queue message. The queue message describes a content of processing that is requested by the request receiver 4011 to the backend processor 4021.

Wordings 501 represent a location of a queue to which a queue message is added. Wordings 502 represent a time-out time. "Visibility Timeout=30" written in the wordings 502 has meaning as follows. If the response indicative of acquisition of the queue message is not given from the backend processor 4021 when 30 seconds have elapsed after the acquisition of the queue message by the backend processor 4021, the queue service 405 makes the queue message visible from an invisible state. "messagettl=3600" written in wordings 503 has meaning as follows. If the backend processor 4021 does not give the deletion instruction for the queue message when 3600 seconds has elapsed, the queue service 405 deletes the queue message although the queue message is not processed by the backend processor 4021 yet. Wordings 504 indicate the date when the queue message is generated.

A message data content part of the queue message will be described. The message data content part is determined in accordance with a process request from the user. Wordings 505 represent a reception ID. In FIG. 5, the reception ID is 0001. The reception ID is unique information that is generated in accordance with the process request from the user. Wordings 506 represent a content ID. In FIG. 5, the content ID is d_00001. Wordings 507 indicate a storage location of a content stored in the document repository 301. Wordings 508 will be described later.

Various tables will be described with reference to FIGS. 6A and 6B. FIG. 6A illustrates a queue management table. FIG. 6B illustrates a process check table.

The queue management table will be described with reference to FIG. 6A. An item 601 of "Queue ID" indicates queue specific information. An item 602 of "Device_id" indicates identification information. The identification information is specific information assigned to every device so as to uniquely identify the device. Different devices have different identification information. In the first embodiment of the present invention, the Queue ID and the Device_id have one by one correspondence. That is, a single queue is assigned to a single image forming device.

An item 603 of "Device model" indicates a maker and a model of a device. The information is called device information hereinafter. Image forming devices that are classified into the same category have the same values for the device information. The device information includes a maker name and a model name. That is, the device information provides two pieces of information including the maker and the model. The details will be described below. "Device_id" when the device information is "1" in FIG. 6A is "Dev_0001." The part "Dev" indicates a maker name. The part "0001" indicates a model name.

An item 604 of "Number of Instance" indicates an upper limit for use of instances determined for each "Queue ID." This will be described in detail. As described above, the plurality of backend processors 4021 are operated on the plurality of virtual machines. The virtual machines can increase the number of instances by using the technique called scaling out. However, if scaling out is indiscriminately performed, this may become a burden for the server computer group 102. The number of instances of the backend processor 4021 is determined in accordance with the device. Accordingly, processing suitable for the performance of the device can be executed.

An item 605 of "Queue Length" indicates a predetermined value for the number of queue messages to be stored in the queue. If the number of queue messages stored in the queue exceeds the value of "Queue Length," the request receiver 4011 determines whether an instruction for scaling out is given. The determination is made because if the number of queue messages stored in the queue exceeds the value of "Queue Length" that is the predetermined value for the queue, the processing of the backend processor 4021 is delayed. As described above, the predetermined value is set in the identification information.

Setting of the queue management table will be described in detail. The administrator of the print system makes access to the administrative request receiver 4011 from the client computer 105. An administrator inputs administrator information for authentication. The request receiver 4011 transmits an operation screen for the administrator to the client computer 105 when the administrator information is authorized. The administrator sets the queue management table through the operation screen. The request receiver 4011 of the administrative virtual machine 407 updates the queue management table on the basis of the information set by the administrator.

An example of setting for the queue table by the administrator will be described. For example, the administrator sets the value of "Number of Instance" to a low value for an image forming device with a low print speed. This is because even if a process request for the image forming device with the low print speed is processed quickly, print data may be stacked in the storage due to the low print speed. Accordingly, the storage in the server computer group 102 may be full. Also, as another example of setting for the queue table, the administrator sets the value of "Queue Length" to a low value for an image forming device with a high print speed. This is because since the image forming device with the high print speed performs printing quickly, the image forming device can process a large amount of print data. Thus, a queue message that is added to a queue corresponding to the image forming device with the high print speed is desirably processed by the backend processor 4021 having a large number of instances. By setting the value of "Queue Length" to a low value, the timing of determination made by the request receiver 4011 whether scaling out is performed or not can be advanced. Consequently, the speed of print processing by the print system can be increased. However, if such advantages are not necessary, the above-mentioned setting does not have to be made.

The process check table will be described with reference to FIG. 6B. The process check table is used for checking whether a process request is completed or not. An item 606 of "request_id" represents a reception ID. An item 607 of "document_id" represents a content ID. An item 608 of "result_storedURI" represents a location where the result of processing by the backend processor 4021 is stored.

Here, an exemplary method for checking whether the process request is completed or not will be described. The platform application 303 of the image forming device 104 performs checking. When the platform application 303 gives a process request to the request receiver 4011, the platform application 303 receives a reception ID for the process request from the request receiver 4011. The platform application 303 makes an inquiry to the request receiver 4011 by polling whether the processing corresponding to the reception ID is ended or not. The request receiver 4011 which has received the inquiry checks reception IDs in the process check table stored in the storage 406. To be more specific, the request receiver 4011 which has received the inquiry checks whether a storage location is written in the column of "result_storedURI" corresponding to the reception ID as the target of the inquiry. If the storage location is written, the request receiver 4011 transmits the storage location to the platform application 303 that is in the process of checking the processing result. If the storage location is not written, the request receiver 4011 transmits the undone state to the platform application 303. Thus, the platform application 303 can check the processing result.

Entries of the process check table are added at two timings as follows. When an addition instruction for a queue message is given to the queue service 405, the request receiver 4011 adds a reception ID and identification information to the process check table stored in the storage 406. For example, a reception ID 0001 in the item 606 and identification information d_00001 in the item 607 in FIG. 6B are added. The backend processor 4021 which has processed the process request adds a storage location in the column of the item 608 corresponding to the processed reception ID. For example, the item 608 may be http://print-sv.blobnet/dev_0001/printdata/pdl_0001.

Figure 7:
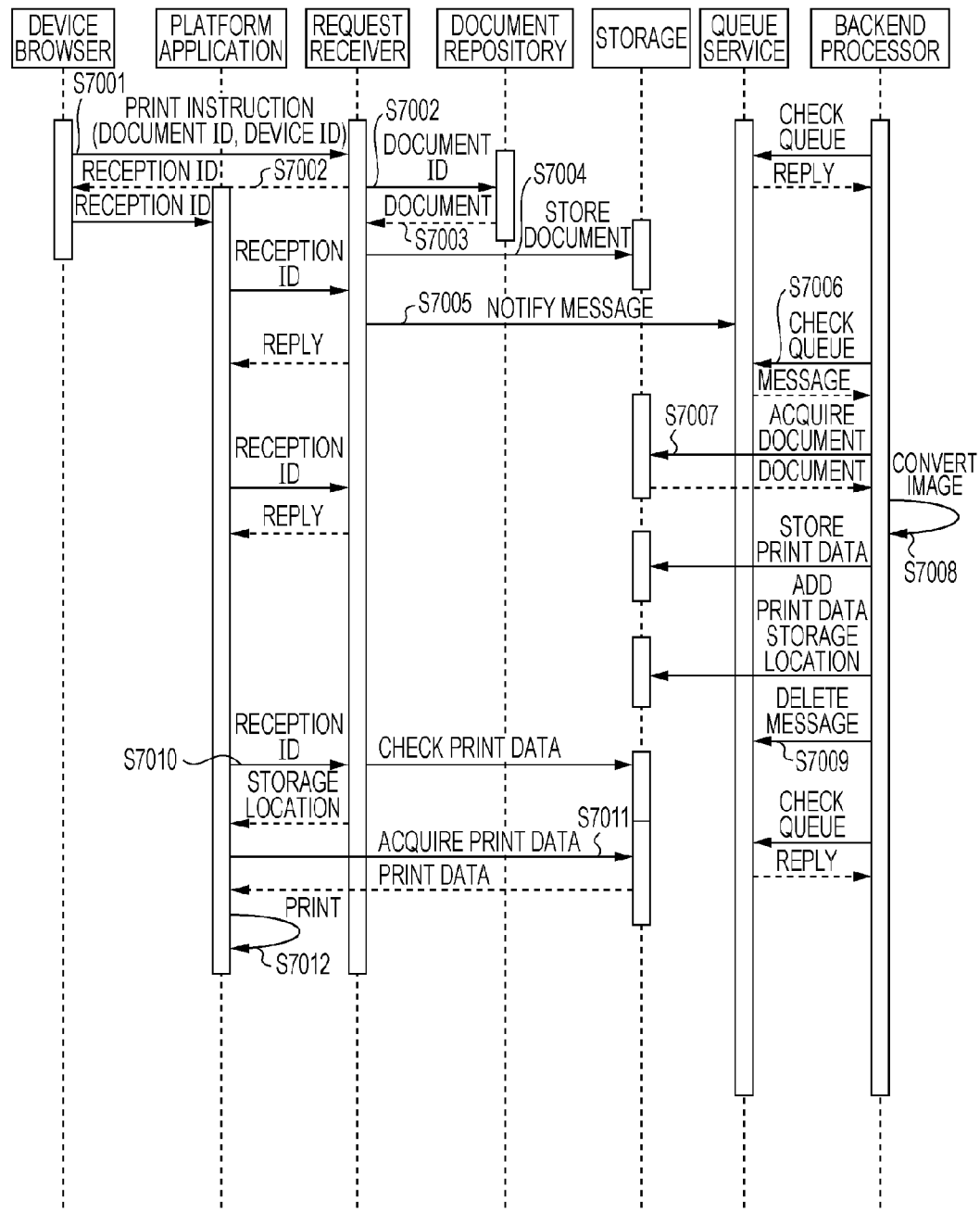
FIG. 7 illustrates a flow of processing executed by the print system.

A procedure of printing with the print system according to the first embodiment of the present invention will be described in detail with reference to FIG. 7. FIG. 7 illustrates a flow of processing that is performed by the print system according to the first embodiment of the present invention. The backend processor 4021 according to the first embodiment of the present invention performs print data processing. An example of the backend processor 4021 that performs the print data processing is called print service.

The user instructs a print request for a content through the device browser. The device browser transmits a content ID of the content as the target of the print instruction, identification information, and the print request to the request receiver 4011 (S7001). The request receiver 4011 which has received the content ID, the identification information, and the print request in S7001 generates a queue message for the print request, and a reception ID. The request receiver 4011 transmits the generated reception ID to the device browser 302.

Also, the request receiver 4011 requests the document repository 301 to acquire a content corresponding to the received content ID (S7002).

The device browser 302 which has received the reception ID in S7002 transmits the reception ID to the platform application 303. The request receiver 4011 which has requested the document repository 301 to acquire the content acquires the content from the document repository 301 (S7003). In S7003 or later, the platform application 303 performs polling for the request receiver 4011 until the platform application 303 recognizes that the print data processing corresponding to the received reception ID is completed. The request receiver 4011 which has acquired the content in S7003 stores the content in the storage 406 (S7004).

The request receiver 4011 which has stored the content in the storage 406 in S7004 gives an addition instruction to the queue service 405 to add a queue message in which a storage location of the content is written to a queue (S7005). The print service checks the presence of the queue message in the queue by polling, the queue which is assigned to that print service. When the request receiver 4011 adds the queue message to the queue, the print service gives an acquisition instruction to the queue service 405 (S7006). The print service which has acquired the queue message in response to the acquisition instruction in S7006 acquires the content from the storage 406 on the basis of the storage location of the content written in the queue message (S7007).

The print service which has acquired the content in S7007 executes print data processing in which the acquired content is converted into print data. At this time, the print service loads the driver program in the memory and executes the print data processing. The print service which has executed the print data processing stores the print data as the execution result in the storage 406 (S7008). The print service which has stored the print data in S7008 writes the storage location of the print data in the process check table in association with the reception ID. The print service can recognize the reception ID from the acquired queue message. The print service gives a deletion instruction for the processed queue message to the queue service (S7009).

The platform application 303 checks the storage location of the print data added to the process check table in S7009 on the basis of the reception ID through the request receiver 4011 (S7010). The platform application 303 which has checked the storage location of the print data in S7010 acquires the print data from the storage 406 (S7011). The platform application 303 which has acquired the print data in S7011 executes processing so that the image forming device 104 prints the print data (S7012). The above-described procedure is for printing with the print system according to the first embodiment of the present invention.

Figure 8:
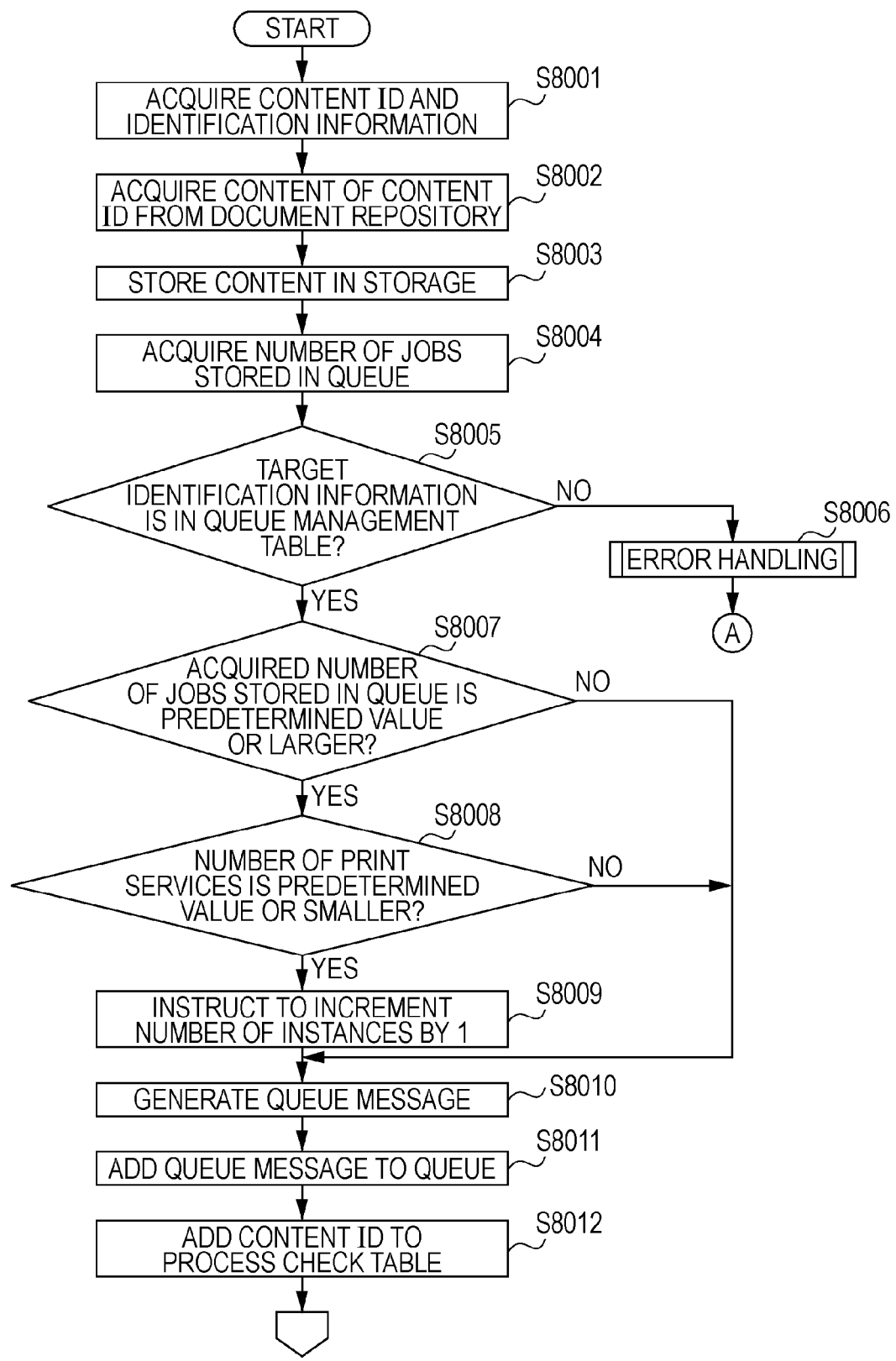
FIG. 8 is a print data generation flowchart executed by a request receiver 4011.
Figure 9:
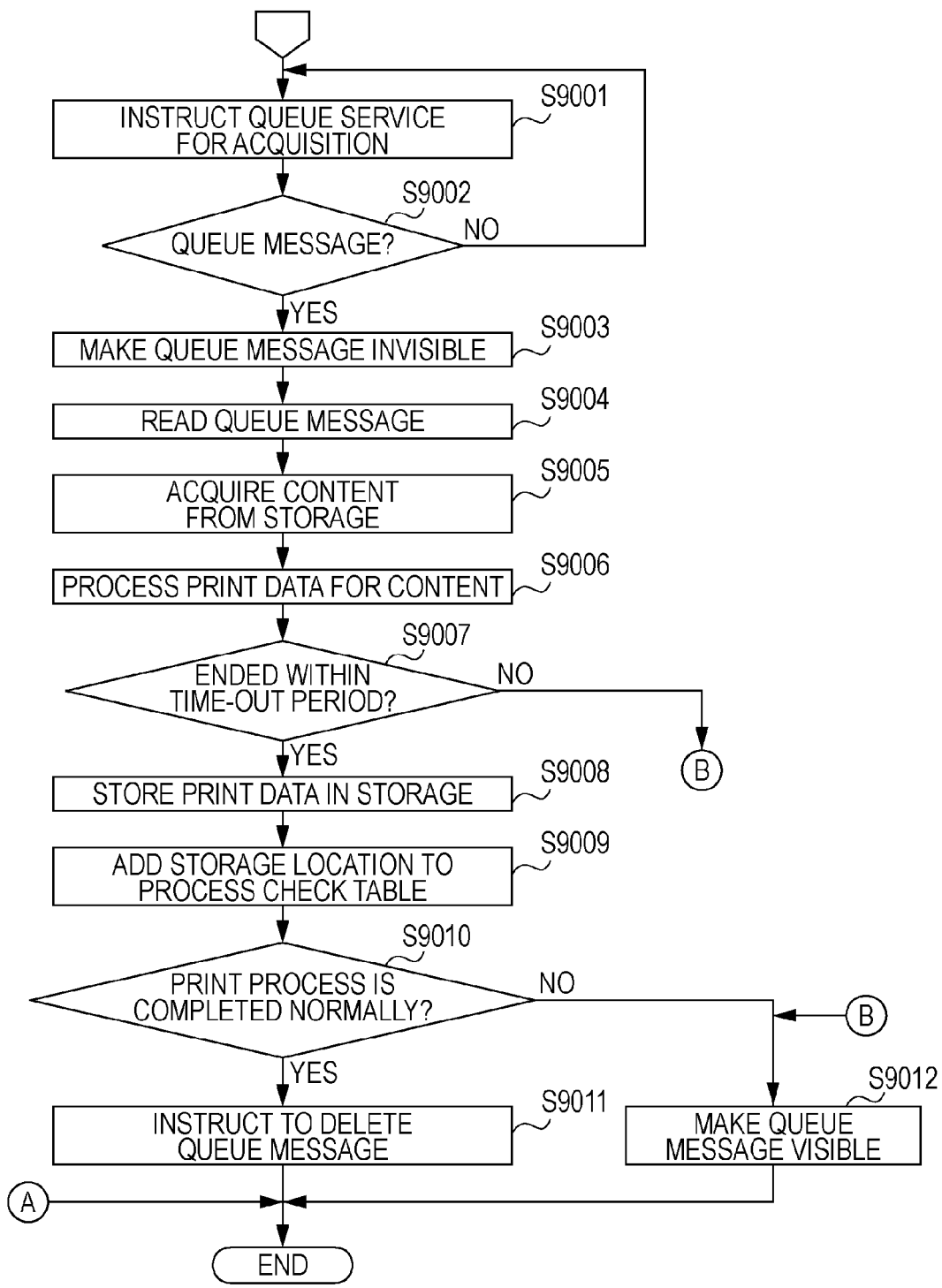
FIG. 9 is a print data generation flowchart executed by a print service.

An operation of the server computer group 102 according to the first embodiment of the present invention will be described in detail with reference to FIGS. 8 and 9. FIG. 8 is a flowchart of the request receiver 4011 for generating print data. FIG. 9 is a flowchart of the print service for generating print data. A job represents a process request from a user. The process request according to the first embodiment of the present invention is a print request. Also, the print service according to the present invention is the print service shown in FIG. 7.

A procedure of generating print data by the request receiver 4011 will be described with reference to FIG. 8. It is to be noted that the request receiver 4011 is not the request receiver 4011 of the administrative virtual machine. The request receiver receives a content ID and identification information requested for printing by the user (S8001).

The request receiver which has received the content ID and the identification information in S8001 acquires content corresponding to the content ID from the document repository (S8002).

The request receiver which has acquired the content in S8002 stores the content in the storage (S8003).

The request receiver which has stored the content in S8003 acquires the number of jobs stored in a queue that is assigned to the received identification information (S8004).

The request receiver which has acquired the number of jobs stored in the queue in S8004 retrieves the queue management table whether target identification information corresponding to the received identification information is present in the queue management table (S8005). As the result of retrieval, if the identification information is not present, the processing goes to S8006. As the result of retrieval, if the identification information is present, the processing goes to S8007.

In S8006, the request receiver executes error handling. The error handling is performed such that the request receiver transmits notification of error to the device browser 302. The device browser 302 which has received the notification of error stops the processing. If the request receiver executes the error processing, the processing of the request receiver goes to "A." If the processing goes to "A," the processing of the print system is stopped.

In S8007, the request receiver checks a predetermined value for the number of jobs that are to be stored in the queue corresponding to the received identification information, from the queue management table. The request receiver determines whether the number of jobs stored in the acquired queue is equal to or larger than the predetermined value for the number of jobs that are to be stored in the queue (S8007). As the result of the determination, if the number of jobs stored in the acquired queue is equal to or larger than the predetermined value, the processing of the request receiver goes to S8008. If the number of jobs stored in the acquired queue is smaller than the predetermined value, the processing of the request receiver goes to S8010.

The request receiver in S8008 checks the number of print services set for (assigned to) the queue corresponding to the received identification information. The request receiver compares the checked number with a predetermined value for the number of print services set in the queue management table. As the result of the comparison, if the checked number is equal to or smaller than the predetermined value, the processing of the request receiver goes to S8009. If the checked number is larger than the predetermined value, the processing of the request receiver goes to S8010.

In S8009, the request receiver gives an instruction to increment the number of instances by 1 for print services. That is, the request receiver 4011 adjusts the number of print services.

In S8010, the request receiver generates a queue message corresponding to the job.

The request receiver which has generated the queue message in S8010 instructs the queue service 405 to add the queue message (S8011). The request receiver which has given the instruction to add the queue message in S8011 adds the content ID of the content corresponding to the added queue message, to the process check table stored in the storage 406 (S8012). The above description is for the procedure of the request receiver for generating the print data.

A procedure of generating the print data by the print service will be described with reference to FIG. 9.

The print service instructs the queue service 405 for acquisition (S9001). The print service which has instructed for acquisition of the queue message in S9001 checks whether the queue message is present (S9002). If it is checked that the queue message is not present in S9002, the print service checks again whether the queue message is present in the queue (polling). If the queue message is present in the queue, the processing of the print service goes to S9003. When the processing goes to S9003, the queue service 405 makes the queue message, which is the target of the instruction for acquisition, invisible.

With S9003, a print service other than the print service which has acquired the queue message can no longer reference the queue message checked in S9002. The queue service 405 executes this processing instead of the print service (S9003).

The print service which has checked the queue message in S9002 reads the queue message (S9004). The queue service 405 specifies the storage location of the content by reading the queue message.

The print service which has specified the storage location of the content in S9004 acquires the content from the storage location in the storage (S9005). The print service which has acquired the content in S9005 executes print data processing for the acquired content (S9006).

At this time, the queue service 405 checks whether the print data processing has been completed within a time-out period set in "Visibility Timeout" written in the queue message (S9007). If the print data processing has not been completed, the processing goes to "B." If the print data processing has been completed, the processing goes to S9008. If the processing goes to "B," the processing is executed from "B" arranged before S9012.

If the processing goes to S9008, the print service stores the print data in the storage 406 (S9008). The print service which has stored the print data in the storage 406 in S9008 adds the storage location of the print data in the storage 406 to the process check table in the storage 406 (S9009).

The print service which has added the storage location of the print data to the process check table in S9009 checks whether the print processing has been completed normally (S9010). If it is determined that the print processing has been completed normally in S9010, the print service instructs the queue service 405 to delete the queue message (S9011). If it is determined that the print processing has not been completed normally, the queue service 405 makes the queue message visible (S9012). By making the queue message visible, the print service acquires the queue message again from the queue, and can execute the print data processing for the content corresponding to the acquired queue message.

Figures 10, 11A:
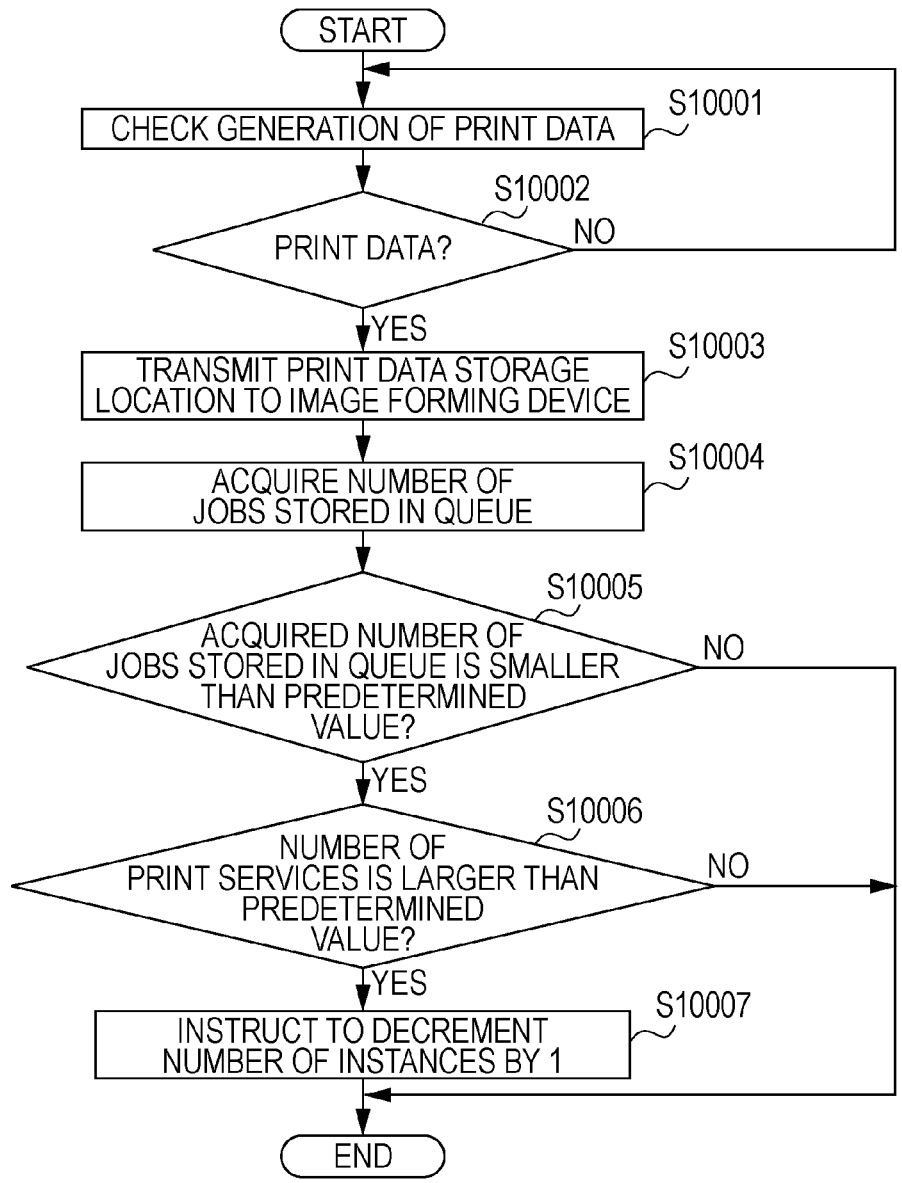
FIG. 10 is a flowchart showing a process for decrementing the number of instances of the print service.
FIG. 11A illustrates an example of a license management table.

A procedure of decrementing the number of instances for print services will be described with reference to FIG. 10. FIG. 10 is processing that is executed by the request receiver 4011. The print service in this description is the print service shown in FIG. 7. The processing is started from a state in which the platform application 303 makes an inquiry by polling for checking a process request.

The request receiver checks whether print data has been generated from the process check table in the storage 406 on the basis of a reception ID (S10001). The request receiver which has checked the generation of the print data in S10001 determines whether print data is present in the storage 406 (S10002). If it is determined that the print data is present in S10002, the processing goes to S10003. If it is determined that the print data is not present, the processing is started again from S10001.

In S10003, the request receiver transmits the storage location of the print data written in the process check table to the image forming device 104. The request receiver which has transmitted the storage location of the print data in S10003 acquires the number of jobs stored in the queue corresponding to the device to which the storage location of the print data has been transmitted (S10004). The request receiver which has acquired the number of jobs stored in the queue in S10004 checks the predetermined value for the number of jobs that are to be stored in the queue corresponding to the received identification information, from the queue management table. The request receiver determines whether the number of jobs stored in the acquired queue is smaller than the predetermined value for the number of jobs that are to be stored in the checked queue (S10005). As the result of the determination, if the number of jobs stored in the acquired queue is smaller than the predetermined value, the processing of the request receiver goes to S10006. If the number of jobs stored in the acquired queue is equal to or larger than the predetermined value, the request receiver ends the processing.

The request receiver in S10006 checks the number of print services set for (assigned to) the queue corresponding to the device, to which the storage location of the print data has been transmitted. The request receiver compares the checked number with the predetermined value for the number of print services set in the queue management table. As the result of the comparison, if the checked number is larger than the predetermined value, the processing of the request receiver goes to S10007. If the checked number is equal to or smaller than the predetermined value, the request receiver ends the processing. In S10007, the request receiver gives an instruction to decrement the number of instances by 1 for print services. That is, the request receiver 4011 adjusts the number of print services.

With the above-described method, the resource of the server computer group 102 can be properly used.

Second Embodiment

According to a second embodiment of the present invention, a method for printing with a print system that is different from the method according to the first embodiment of the present invention will be described. In the second embodiment of the present invention, a user has to make a registration previously to use of the print system. The degree of use for the resource of the server computer group 102 changes in accordance with the registration content. Part of the second embodiment different from the first embodiment of the present invention will be described.

Identification information in the second embodiment of the present invention is not specific information assigned to every image forming device. The identification information according to the second embodiment of the present invention is register information. The register information will be described below. In the second embodiment of the present invention, a registration has to be made when a user uses the print system. The content of registration may include, for example, an ID of a print system user, a password associated with the ID, and a license. For example, the user inputs registration content by using the device browser 302. The details of the license will be described later. The registration is performed before the user uses the print system. If the registration is performed, register information is generated on the basis of the input information. The register information is generated by the administrative virtual machine 407. The user is authenticated by the server computer group 102 on the basis of the register information, and then uses the print system. If a user corresponding to register information which has not been registered yet makes access, such access is processed as an error (described later). Also, IDs for a plurality of print system users may be registered in single register information. The register information can be integrated on a group basis.

Figures 11B, 12:
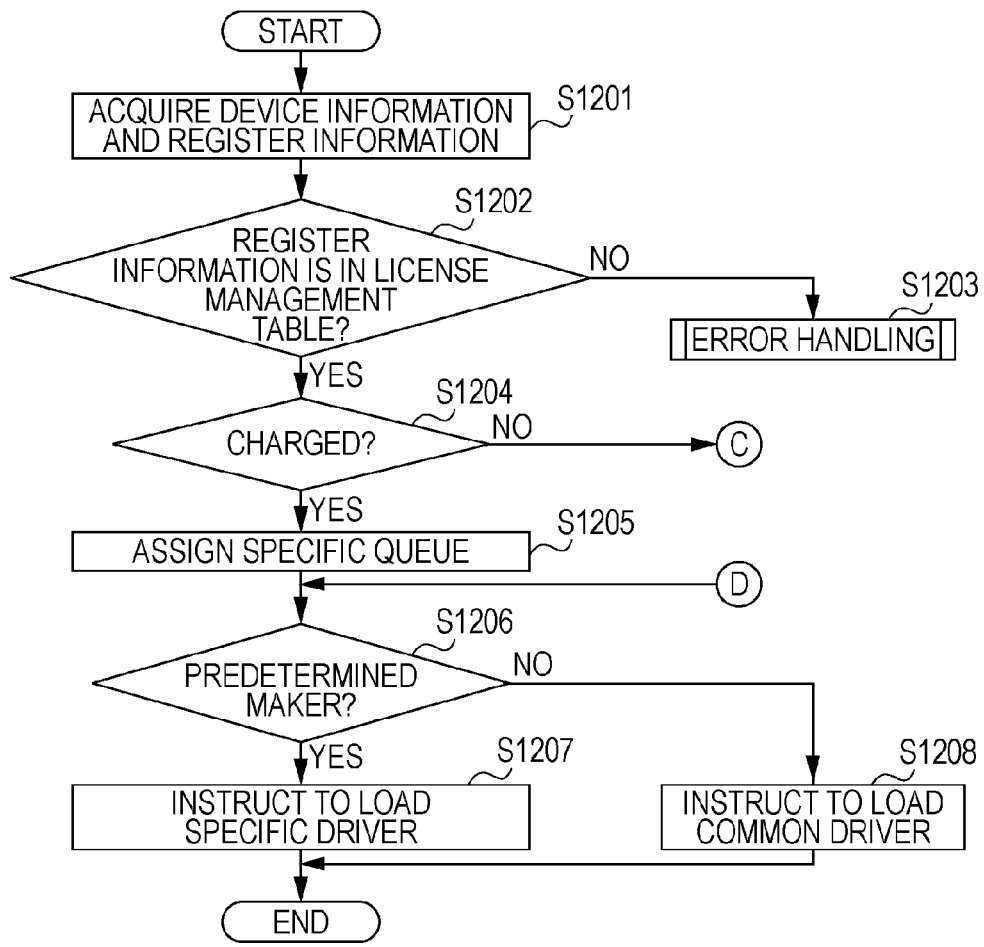
FIG. 11B illustrates an example of a queue management table according to a second embodiment.
FIG. 12 illustrates a flow of setting processing in accordance with register information.

Since the register information is provided, the queue management table becomes a table shown in FIG. 11B. In this table, "Device_id" and "Device model" are deleted. Also, a license management table is stored in the storage 406. An item 614 in the queue management table is "QueueID" equivalent to the item 601. An item 615 is "Number of Instance" equivalent to the item 604. An item 616 is "Queue Length" equivalent to the item 605.

The license management table will be described with reference to FIG. 11A. An item 612 is "Register" that is indicative of the register information. An item 613 is "License" that is indicative of the license. The license will be described.

When a user makes a registration, the user may set whether the user is charged for the use of the print system. For example, setting may be performed as follows. A user who is charged more for the print system can use a larger number of resources in the server computer group 102. A user who is charged less for the print system can use only a smaller number of resources in the server computer group 102 as compared with the user who is charged more. A user without charge can use only a further smaller number of resources in the server computer group 102 as compared with the user who is charged less. The aforementioned license is provided as an index for the level of charge (payment) and whether the user is charged or not.

The second embodiment 2 of the present invention determines the license as follows. If "A" is provided in "License" of the item 613, the user is charged more. If "B" is provided in "License" of the item 613, the user is charged less. If "No" is provided in "License" of the item 613, the user is not charged.

The relationship between the queue management table and the license management table will be described below. The request receiver 4011 which has acquired the register information references the license management table, and determines whether the acquired register information is present in the license management table. If the acquired register information is present, the request receiver 4011 checks a license registered in the license management table. The request receiver 4011 specifies a queue ID corresponding to the license. This processing will be described below in detail. Referring to FIG. 11A, register information of "user_a" for the value of "Register" in the item 612 has "A" for the value of "License" in the item 613. If the value of "License" in the item 613 is "A," a queue numbered "1" for the value of "QueueID" in the item 609 is assigned. Similarly, referring to FIG. 11A, register information of "user_b" for the value of "Register" in the item 612 has "B" for the value of "License" in the item 613. If the value of "License" in the item 613 is "B," a queue numbered "2" for the value of "QueueID" in the item 609 is assigned. Also, if the value of "License" in the item 613 for register information is "No," a queue numbered a value in a range from "100" to "103" for the value of "QueueID" in the item 609 is assigned. The assignment of the queue will be described later.

If register information with the value of "License" in the item 613 being "A" is present in addition to the register information of "user_a," for example, another queue having a predetermined instance value equivalent to the predetermined instance value with "QueueID" being "1" may be assigned. Accordingly, a queue is individually assigned to register information for printing with charge. A queue is not individually assigned to register information without charge, but a queue that is commonly used in a certain group is assigned. This is the difference between the service with charge and the service without charge. The queue individually assigned to the register information is called specific queue, and the queue that is commonly used in the certain group is called common queue.

Similarly to the first embodiment of the present invention, the queue management table can be operated with the administrative virtual machine 407. Also, the license management table can be operated with the administrative virtual machine 407. Other configurations not described here are similar to those according to the first embodiment of the present invention. To be more specific, such configurations may include the configuration of the print system and the inner configurations of the respective devices.

Figure 13:
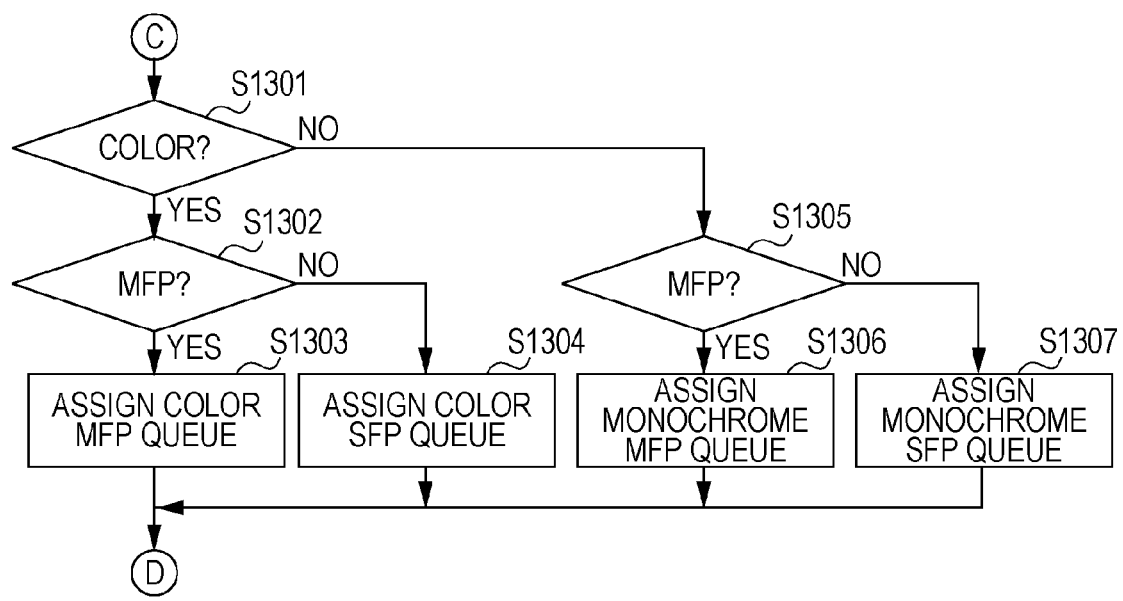
FIG. 13 illustrates processing for assigning a queue in accordance with register information that is not charged.

Processing for changing a queue that is assigned to register information in accordance with a license in the register information will be described below with reference to FIGS. 12 and 13. FIG. 12 illustrates a flow of setting processing in accordance with register information. FIG. 13 illustrates processing for assigning a queue in accordance with register information without charge.

The user transmits the registration content to the administrative virtual machine 407 through the device browser in the image forming device 104. The administrative virtual machine 407 generates register information in accordance with the registration content input by the user, and transmits the register information to the user. The administrator uses the administrative virtual machine 407 to update the queue management table in accordance with the registration content. The administrator does not have to manually update the queue management table, and the administrative virtual machine 407 may automatically update the queue management table.

The user who wants to perform printing with the print system transmits the register information to the virtual machine 401 that is not the administrative machine. At this time, the image forming device 104 also transmits device information. Additionally, the user may transmit an ID and a password of the print system user in addition to the register information. Accordingly, it is assured that the user who uses the transmitted register information is an authorized user on the basis of the ID of the print system user and the password corresponding to the ID.

The request receiver 4011 acquires the device information and the register information (S1201). The request receiver 4011 which has acquired the device information and the register information in S1201 determines whether register information equivalent to the acquired register information is present in the license management table (S1202). If it is determined that the registered information is not present in S1202, the processing goes to S1203, performs error handling, and stops the processing. If it is determined that the print data is present in S1202, the processing goes to S1204. In S1204, the request receiver 4011 determines whether the acquired register information is charged on the basis of the license management table. That is, it is determined whether the register information is subjected to be charged. If the register information is not charged, the processing goes to "C." If the register information is charged, the processing goes to S1205.

The processing of the request receiver 4011 when the processing goes to "C" will be described. The request receiver 4011 determines whether the image forming device 104 handles color images on the basis of the device information (S1301). The determination is made with reference to a maker name and a model name written in the device information. If it is determined that the color images are handled in S1301, the processing goes to S1302. If it is determined that the color images are not handled, the processing goes to S1305.

In S1302, the request receiver 4011 determines whether the image forming device 104 is a multi functional peripheral (MFP) on the basis of the device information. If it is determined that the image forming device 104 is MFP, processing in S1303 is executed. In particular, a queue of color MFP is assigned to the acquired register information (S1303). The queue of the color MFP is a queue in a table with "100" for "QueueID" in FIG. 11B. If it is determined that the image forming device 104 is not MFP, a queue of color single function peripheral (SFP) is assigned (S1304). The queue of the color SFP is a queue in a table with "101" for "QueueID" in FIG. 11B.

In S1305, the request receiver 4011 determines whether the image forming device is a multi functional peripheral (MFP) on the basis of the device information. If it is determined that the image forming device 104 is MFP, processing in S1306 is executed. In particular, a queue of monochrome MFP is assigned to the acquired register information (S1306). The queue of the monochrome MFP is a queue in a table with "102" for "QueueID" in FIG. 11B. If it is determined that the image forming device 104 is not MFP, a queue of color single function peripheral (SFP) is assigned (S1307). The queue of the monochrome SFP is a queue in a table with "103" for "QueueID" in FIG. 11B. The processing of the request receiver 4011 which has completed the processing of S1303, S1304, S1306, or S1307 goes to "D," and the request receiver 4011 executes the processing from S1206.

In S1205, the request receiver 4011 assigns a predetermined queue corresponding to the register information, to the register information. The queue is different from the queue of the color MFP or the monochrome SFP, which is other than the predetermined queue. The predetermined queue is a queue specific to the register information. The processing of the request receiver 4011 goes to S1206.

In S1206, the request receiver 4011 determines whether the device is made by a predetermined maker on the basis of the device information. The predetermined maker is a maker previously determined by the administrator. The administrator determines the predetermined maker because it is necessary to judge whether the image forming device 104 subjected to printing can perform printing with a sufficiently high quality. If it is determined that the device is made by the predetermined maker, the request receiver 4011 instructs the back-end processor 4021 to load a specific driver program (S1207). If it is determined that the device is not made by the predetermined maker, the request receiver 4011 instructs the back-end processor 4021 to load a common driver program (S1208).

The specific driver program and the common driver program will be described. The specific driver program can sufficiently satisfy designated print setting. In contrast, the common program driver only satisfies part of print setting. For example, the common driver can set a sheet size or a sheet-feed port for sheets, but cannot set finishing, such as stapling or punching, or paging for bookbinding printing etc.

The image forming device is discriminated as described above, because if the cloud provides a not insured service to an image forming device with a not insured function, the user may not obtain printing that the user intends. Consequently, in view of the user, the user may have troublesome work to redo printing. In addition, if the user pays for printing, the payment for printing may be wasted, and consumable goods of the image forming device may be wasted. In view of the provider of the cloud service, the cloud resource may be wasted. Owing to this, for example, the service is changed in accordance with the maker as described above. In the second embodiment of the present invention, the determination is made on the basis of the maker name Additionally, the determination may be made also on the basis of the model name. Alternatively, the determination may be made only on the basis of the model name.

Part of processing that is different from the processing in FIG. 8 by the request receiver 4011 according to the first embodiment will be described. In S8001 in FIG. 8, the request receiver 4011 does not acquire a device ID. In S8004, when the request receiver 4011 acquires the number of jobs stored in the queue, the request receiver specifies the queue on the basis of the register information and acquires the number of stored jobs. The processing S8005 and S8006 is not performed. When the queue is specified with reference to the queue management table in S8007 and S8008, the request receiver 4011 specifies the queue on the basis of the register information.

With the above-described method, the resource of the server computer group 102 can be properly used.

Other Embodiments

In the embodiments of the present invention, the single image forming device 104 and the single client computer 105 are provided. However, a plurality of image forming devices and a plurality of client computers may be provided.

In the embodiments of the present invention, the server computer group 102 executes the print data processing and transmits the print data to the printer. However, the server computer group 102 may execute processing for converting print data into a raster image, in addition to the print data processing.

In the embodiments of the present invention, the content generated by the application software on the server computer group 102 is temporarily stored in the document repository. However, the content does not have to be temporarily stored in the document repository. In this case, printing with the print system is performed as follows. The user transmits the print instruction to the application software through the device browser. The application software stores the generated content in any one of hardware resources in the server computer group 102.

In the embodiments of the present invention, the single instance is operated in the single server computer. However, a plurality of instances may be operated on the single server computer. For example, if a multi-core CPU is used, a single instance may be assigned to a single core in the CPU, or a single instance may be assigned to two cores in the CPU. The assignment configuration of a single instance is not particularly limited.

In the embodiments of the present invention, the functions of the server computer group 102 are divided such that a server computer has the function of the request receiver 4011, a server computer has the function of the backend processor 4021, and a server computer has the functions of both the queue service 405 and the storage 406. However, the functions owned by the server computers do not have to be combined as mentioned above. For example, the functions may be divided such that a server computer has the functions of both the request receiver 4011 and the backend processor 4021, and a server computer has the functions of both the queue service 405 and the storage 406. Alternatively, the functions may be divided such that a server computer has the functions of the request receiver 4011 and the queue service 405, and a server computer has the functions of the backend processor 4021 and the storage 406. When the functions are actualized, allocations of the functions to server computers are not particularly limited.

In the embodiments of the present invention, the process request by the user is sent from the device browser of the image forming device 104. However, the process request may be sent from the device browser of the client computer 105. In this case, the client computer 105 may designate the image forming device 104. The client computer 105 instructs the request receiver 4011 to execute polling for the image forming device 104.

In the embodiments of the present invention, the number of instances is incremented or decremented by 1. However, the number of instances may be incremented or decremented by a value larger than 1 (for example, the number of instances may be incremented by 2 through single processing, and decremented by 3 through single processing).

In the embodiments of the present invention, the wordings 508 shown in the queue message in FIG. 5 are not used. However, a method using the wordings 508 is conceivable. In this case, the process check is no longer required. When the request receiver 4011 generates a queue message, the request receiver 4011 designates the location where the result processed by the backend processor 4021 is stored. The backend processor 4021 checks the queue message and stores the processed result in the designated location.

In the embodiments of the present invention, the single request receiver 4011 and the single backend processor 4021 are assigned to the single virtual machine. However, a plurality of request receiver 4011 and a plurality of backend processors 4021 may be assigned to a single virtual machine. For example, two request receivers 4011 may present in the virtual machine 407.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

102 server computer group
1062 CPU
1063 direct storage
1064 indirect storage
4011 request receiver
4021 backend processor
405 queue service
406 storage

The invention claimed is:

1. An information processing system including at least an image processing device, the information processing system comprising:
   a receiving unit configured to receive a print request and identification information for identifying an image forming device, wherein a number of jobs are set in the identification information;
   a specifying unit configured to specify a queue corresponding to the image forming device based on the identification information, wherein the specified queue stores the number of jobs, wherein print services process jobs stored in the specified queue, and wherein a predetermined number of print services are set in a queue management table corresponding to the specified queue;
   an acquiring unit configured to acquire the number of jobs that are stored in the specified queue; and
   an adjusting unit configured to adjust a number of print services depending on whether the number of jobs is equal to or larger than a predetermined number of jobs set in the identification information and depending on whether the number of print services that process the jobs stored in the specified queue is equal to or smaller than the predetermined number of print services set in the queue management table, wherein the print services, the number of which has been adjusted by the adjusting unit, include an executing unit configured to execute processing for converting content corresponding to the print request into print data.

2. The information processing system according to claim 1, wherein the number of print services is incremented if the number of jobs acquired by the acquiring unit is equal to or larger than the predetermined number of jobs set in the identification information and if the number of print services that process the jobs stored in the specified queue is equal to or smaller than the predetermined number of print services.

3. The information processing system according to claim 2, wherein the number of print services is decremented if the number of jobs acquired by the acquiring unit is smaller than the predetermined number of jobs set in the identification information and if the number of print services that process the jobs stored in the specified queue is larger than the predetermined number of print services.

4. The information processing system according to claim 1, wherein the receiving unit generates a queue message corresponding to the print request.

5. The information processing system according to claim 4, wherein the receiving unit instructs a queue service to add the queue message to the specified queue.

6. A method for controlling an information processing system including at least an information processing device, the method comprising:
    receiving a print request and identification information for identifying an image forming device, wherein a number of jobs are set in the identification information;
    specifying a queue corresponding to the image forming device based on the received identification information, wherein the specified queue stores the number of jobs, wherein a number of print services process jobs stored in the specified queue, and wherein a predetermined number of print services are set in a queue management table corresponding to the specified queue;
    acquiring the number of jobs that are stored in the specified queue; and
    adjusting a number of print services depending on whether a number of the acquired jobs is equal to or larger than a predetermined number of jobs set in the identification information and depending on whether the number of print services that process the jobs stored in the specified queue is equal to or smaller than the predetermined number of print services set in a queue management table, wherein the print services, the number of which has been adjusted, execute processing for converting content corresponding to the received print request into print data.

7. The method according to claim 6, wherein the number of print services is incremented if the number of acquired jobs is equal to or larger than the predetermined number of jobs set in the identification information and if the number of print services that process the jobs stored in the specified queue is equal to or smaller than the predetermined number of print services.

8. The method according to claim 7, wherein the number of print services is decremented if the number of acquired jobs is smaller than the predetermined number of jobs set in the identification information and if the number of print services that process the jobs stored in the specified queue is larger than the predetermined number of print services.

9. The method according to claim 6, further comprising generating a queue message corresponding to the print request.

10. The method according to claim 9, further comprising instructing a queue service to add the queue message to the specified queue.

11. An information processing system including at least an information processing device, the information processing system comprising:
    a demand processing unit configured to receive a process demand from an external device through a network and store a process request corresponding to the received process demand in a storage service, wherein a plurality of process requests are stored in the storage service and a plurality of backend processing units are assigned to the storage service;
    a backend processing unit configured to periodically instruct the storage service to give a process request stored in the storage service, acquire the process request, and perform processing based on the acquired process request;
    a fabric controller configured to control the plurality of backend processing unit; and
    an increment instructing unit configured to check a number of process requests that are stored in the storage service, and give an instruction to increment the number of backend processing units if the number of process requests stored in the storage service is equal to or larger than a predetermined value,
    wherein, when an error occurs in the backend processing unit, the fabric controller controls the plurality of backend processing unit so that the process request is given to another backend processing unit that is different from the backend processing unit.

12. The information processing system according to claim 11, wherein the increment instructing unit acquires the number of backend processing units assigned to the storage service and increments the number of backend processing units if the number of process request stored in the storage service is equal to or larger than the predetermined value and if the number of backend processing units is smaller than an upper limit value.

13. A print system, comprising:
    an image forming device, wherein the image forming device includes a transmitting unit configured to transmit a process demand; and
    an information processing system including at least an information processing device, wherein the information processing system includes:
        a demand processing unit configured to receive a process demand transmitted by the transmitting unit and store a process request corresponding to the received process demand in a storage service, wherein a number of process requests are stored in the storage service and a number of backend processing units are assigned to the storage service,
        a backend processing unit configured to periodically instruct the storage service to acquire the process requests stored in the storage service, acquire the process requests, and perform processing based on the acquired process requests,
        a fabric controller configured to control the demand processing unit and the backend processing unit, and
        an increment instructing unit configured to check the number of process requests that are stored in the storage service, and give an instruction to increment the number of backend processing units if the number of process requests stored in the storage service is equal to or larger than a predetermined value, wherein, when there is an error in the demand processing unit or in the backend processing unit, the fabric controller gives the process demand to another backend processing unit that is different from the backend processing unit.

* * * * *